US008460810B2

(12) United States Patent
Lee et al.

(10) Patent No.: US 8,460,810 B2
(45) Date of Patent: Jun. 11, 2013

(54) RECHARGEABLE BATTERY

(75) Inventors: Dong-Hyun Lee, Suwon-Si (KR);
Sang-Eun Cheon, Suwon-Si (KR);
Tatsuya Hashimoto, Suwon-Si (KR);
Seok-Yoon Yoo, Suwon-Si (KR);
Chi-Young Lee, Suwon-Si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 366 days.

(21) Appl. No.: 12/643,964

(22) Filed: Dec. 21, 2009

(65) Prior Publication Data

US 2010/0167113 A1 Jul. 1, 2010

(30) Foreign Application Priority Data

Dec. 30, 2008 (KR) .................. 10-2008-0137228

(51) Int. Cl.
*H01M 10/04* (2006.01)
(52) U.S. Cl.
USPC ............................................ 429/94; 429/161
(58) Field of Classification Search
USPC .......................................................... 429/94
See application file for complete search history.

(56) References Cited

U.S. PATENT DOCUMENTS

| | | | | |
|---|---|---|---|---|
| 3,081,367 | A * | 3/1963 | Field et al. ..................... | 429/94 |
| 4,051,304 | A | 9/1977 | Snook | |
| 2006/0024568 | A1* | 2/2006 | Lee ............................ | 429/130 |
| 2006/0051664 | A1* | 3/2006 | Tasai et al. ..................... | 429/161 |
| 2008/0076020 | A1* | 3/2008 | Wu ............................ | 429/161 |
| 2008/0081250 | A1* | 4/2008 | Miller ........................ | 429/128 |
| 2009/0305121 | A1 | 12/2009 | Yoon et al. | |

FOREIGN PATENT DOCUMENTS

| | | |
|---|---|---|
| DE | 10112162 A1 | 10/2002 |
| EP | 1 244 169 A1 | 9/2002 |
| EP | 2204871 A1 | 7/2010 |
| GB | 1 533 116 | 11/1978 |
| JP | 2002-506276 | 2/2002 |
| JP | 2003-157888 | 5/2003 |
| JP | 2003-257471 | 9/2003 |
| JP | 2009-537945 | 10/2009 |
| KR | 10-2007-0110568 A | 11/2007 |
| WO | WO 2007/132992 A1 | 11/2007 |

OTHER PUBLICATIONS

European Search Report dated Mar. 10, 2011, for corresponding European Patent application 09180120.9, noting listed reference in this IDS, as well as DE 101 12 162, previously filed in an IDS dated Mar. 18, 2010.
European search report dated Feb. 4, 2010 of the corresponding European Patent Application No. 09180120.9, 5 pages.
SIPO Office action dated Apr. 28, 2012, for corresponding Chinese Patent application 200910258860.4, (8 pages).
SIPO Office action dated Jan. 5, 2013, for corresponding Chinese Patent application 200910258860.4, with English translation, (15 pages).

* cited by examiner

*Primary Examiner* — John S Maples
(74) *Attorney, Agent, or Firm* — Christie, Parker & Hale, LLP (57) ABSTRACT

A rechargeable battery includes an electrode assembly comprising a positive electrode, a negative electrode, and a separator between the positive electrode and the negative electrode wound together and a case housing the electrode assembly, wherein the electrode assembly has an inner surface and an outer surface having a concave portion.

16 Claims, 11 Drawing Sheets

RECHARGEABLE BATTERY

CROSS-REFERENCE TO RELATED APPLICATION

This application claims priority to and the benefit of Korean Patent Application No. 10-2008-0137228 filed in the Korean Intellectual Property Office on Dec. 30, 2008, the entire content of which is incorporated herein by reference.

BACKGROUND OF THE INVENTION

1. Field of the Invention

The present invention relates to a rechargeable battery.

2. Description of the Related Art

Rechargeable batteries can be repeatedly charged and discharged unlike primary batteries which cannot be repeatedly charged. A low-capacity rechargeable battery constituting one cell is used for a small portable electronic device, i.e., a mobile phone, a laptop computer, or a camcorder. A large-capacity rechargeable battery constituting a plurality of cells connected to each other in a pack type is widely used for a power supply for driving a motor in a hybrid electric vehicle, etc.

Rechargeable batteries are manufactured in various shapes. Exemplary shapes may include a cylindrical shape, a quadrangular shape, etc.

Rechargeable batteries which are coupled with each other in series to be used for driving a motor in an electric vehicle, etc. that requires high power may constitute a large-capacity rechargeable battery module.

As the rechargeable battery is repetitively charged and discharged, an electrode assembly is repetitively expanded and contracted. As a result, the stress between the electrode assembly and a case and between the electrode assembly and a core around which the electrode assembly is wound increases. Since a space is provided between the case and the electrode assembly, the stress can be absorbed to some degree even though the stress is generated, but since the space between the electrode assembly and the core is narrow, a comparatively large stress is generated. Of course, when the electrode assembly is excessively expanded, the stress gradually increases between the electrode assembly and the case.

When the stress is concentrated on the electrode assembly, the electrode assembly is pressed, thus, the electrolyte solution remaining in the electrode assembly moves outside of the electrode assembly. Therefore, charge efficiency and heat radiation efficiency are deteriorated and the output of the rechargeable battery is reduced. These problems can become fatal defects in evaluating the lifespan and performance of the high-output rechargeable battery.

Further, a rechargeable battery used in an electric vehicle (EV) or a hybrid electric vehicle (HEV) performs rapid charging and discharging operations. It is most important that the output of the rechargeable battery is not deteriorated even at the time of performing a rapid charging and discharging operation. However, when the charging and discharging operations are rapidly performed, the electrode assembly is expanded more rapidly as described above, such that the output is remarkably reduced. The problem occurs because the stress between the electrode assembly and the core increase. The lifespan of a portion on which the stress is concentrated is deteriorated, such that the lifespan of the rechargeable battery is reduced. Further, when the stress is not alleviated, the separator is pressed, such that the separator cannot normally transfer ions. As a result, the output of the rechargeable battery is lowered.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention have been made to provide a rechargeable battery able to minimize a stress acting on an electrode assembly even if the electrode assembly is expanded.

According to one embodiment of the present invention, a rechargeable battery includes an electrode assembly comprising a positive electrode, a negative electrode, and a separator between the positive electrode and the negative electrode wound together; and a case housing the electrode assembly, wherein the electrode assembly has an inner surface and an outer surface having a concave portion.

In one embodiment, the outer surface has a convex portion facing a first direction, and the concave portion faces a second direction substantially opposite to the first direction. Further, the electrode assembly may be folded and, in one embodiment, the positive electrode and the negative electrode each include a coated portion coated with an active material and an uncoated portion absent the active material; wherein the uncoated portion of the positive electrode extends from the coated portion of the positive electrode in a third direction; and wherein the uncoated portion of the negative electrode extends from the coated portion of the negative electrode in a fourth direction substantially opposite to the third direction.

In one embodiment, the electrode assembly has a first end extending into a space defined by the concave portion, and a second end facing the first end.

In one embodiment, a support rod contacts the concave portion. The case may have a cylindrical shape or a quadrangular shape and the outer surface may have a first portion and a second portion contacting each other at an interface.

In one embodiment, the electrode assembly has a C shape or a spiral shape. Further, in one embodiment, a first expansion space is defined by the concave surface of the outer surface and a second expansion space is defined by the inner surface, and the inner surface may be tension. An outer circumferential length of the electrode assembly may be greater than an outer circumferential length of the case. In one embodiment, the outer surface is folded and contacts itself. In one embodiment, a first end of the electrode assembly may be adjacent the expansion space.

DESCRIPTION OF SELECTED REFERENCE NUMERALS

| | |
|---|---|
| 100: | Rechargeable battery |
| 110: | Electrode assembly |
| 112: | Positive electrode |
| 113: | Negative electrode |
| 114: | Separator |
| 115: | Outer surface |
| 115a: | First expansion space |
| 116: | Inner surface |
| 116a: | Second expansion space |
| 117: | Concave portion |
| 118: | Convex portion |
| 119: | End |
| 120: | Case |
| 130: | Support rod |
| 140: | Cap assembly |
| 214: | Bent portion |
| 215a: | Opposed portion |
| 230: | Interface portion |

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
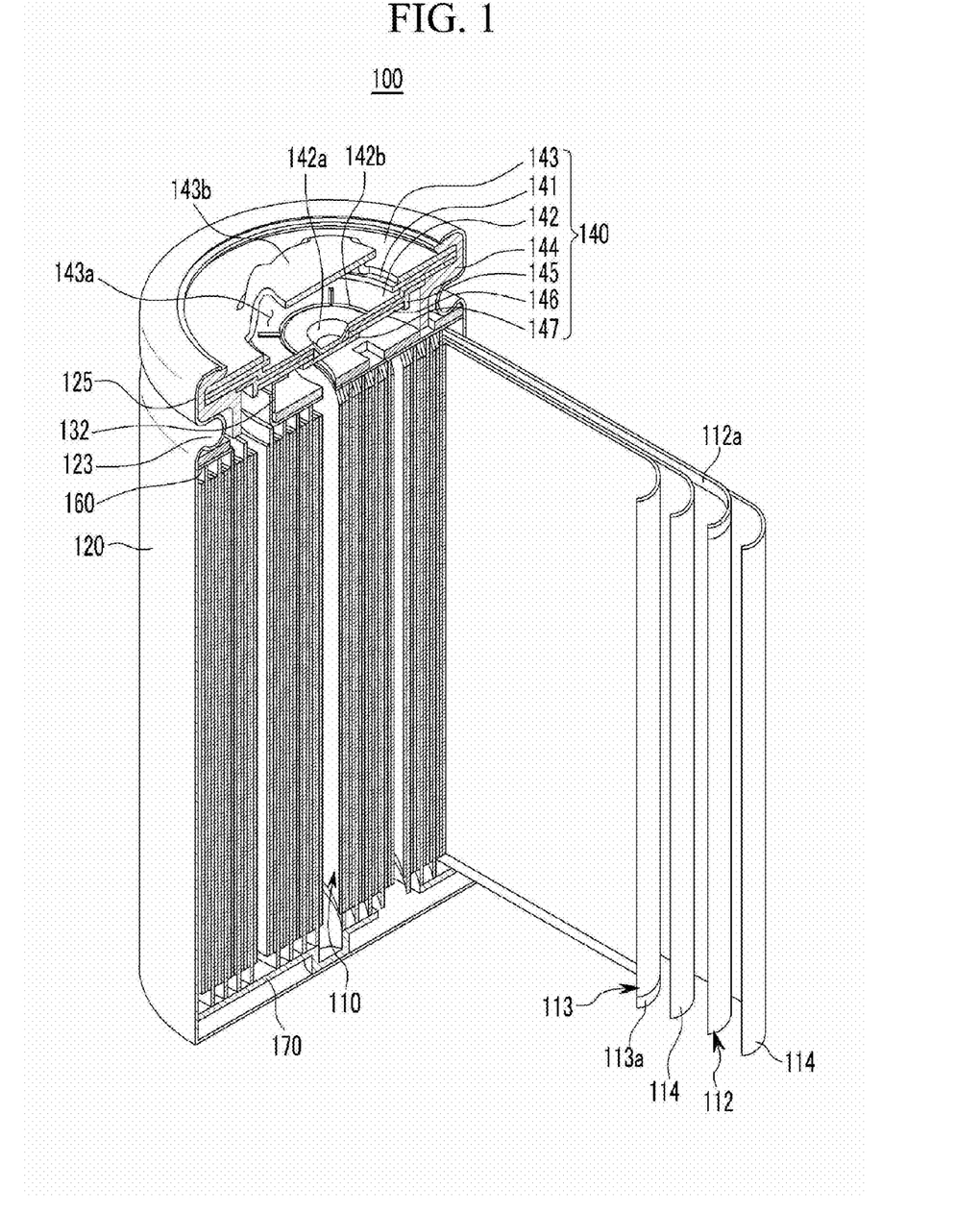
FIG. 1 is a cross-sectional perspective view of a rechargeable battery according to a first exemplary embodiment of the present invention.

FIG. 1 is a cross-sectional perspective view of a rechargeable battery according to a first exemplary embodiment of the present invention.

Referring to FIG. 1, the rechargeable battery 100 according to the present exemplary embodiment includes an electrode assembly 110 in which a positive electrode 112 and a negative electrode 113 are positioned with a separator 114 interposed therebetween and a case 120 that has an opening formed at one end thereof for housing the electrode assembly 110 in addition to an electrolyte solution. In addition, a cap assembly 140 for sealing the case 120 is installed at the opening of the case 120 via a gasket 144.

More specifically, the case 120 is made of a conductive metal such as aluminum, an aluminum alloy, or nickel-plated steel.

In addition, the case 120 according to the exemplary embodiment has a cylindrical shape having an inner space where the electrode assembly 110 is positioned. The cap assembly 140 is fixed to the case 120 by fitting it over and clamping it to the case 120. In this process, a beading portion 123 and a clamping portion 125 are formed in the case 120.

The positive electrode 112, the separator 114, and the negative electrode 113 are stacked and wound in an eddy current shape to form the electrode assembly 110 according to the exemplary embodiment as described in more detail below. A positive electrode uncoated portion 112a where a positive active material is absent is formed at an upper end of the positive electrode 112 and is electrically connected with a positive electrode current collecting plate 160. Further, a negative electrode uncoated portion 113a where a negative active material is absent is formed at a lower end of the negative electrode 113 and is electrically connected with a negative electrode current collecting plate 170.

The negative electrode 113 has a structure in which the negative active material is applied to a current collector made of copper or aluminum. The positive electrode 112 has a structure in which a positive active material is applied to a current collector made of aluminum.

The negative active material may be composed of a carbon-based active material, a silicon-based active material, or a titanium-based active material. The positive active material may be composed of the carbon-based active material, a nickel-based active material, a manganese-based active material, a cobalt-based active material, a ternary-based active material, or an olivine-based active material.

In the present exemplary embodiment, the positive electrode current collecting plate 160 is installed at an upper part and the negative electrode current collecting plate 170 is installed at a lower part, but the present invention is not limited thereto and the positive electrode current collecting plate 160 may be installed at the lower part and the negative electrode current collecting plate 170 may be installed at the upper part.

The cap assembly 140 includes a cap-up 143 in which a protruding outer terminal 143b and an exhaust hole 143a are formed and a vent plate 142 which is installed below the cap-up 143 and has a notch 142b that is fractured under a predetermined pressure condition to discharge gas. The vent plate 142 serves to intercept electrical connection between the electrode assembly 110 and the cap-up 143 under the predetermined pressure condition.

A positive temperature coefficient element 141 is installed between the cap-up 143 and the vent plate 142. The positive temperature coefficient element 141 is a device of which electric resistance increases approximately to infinity over a predetermined temperature and serves to intercept flow of charged current and discharged current when the rechargeable battery 100 is at a predetermined temperature or more.

A convex portion 142a protruding downward is formed at the center of the vent plate 142 and a sub-plate 147 is attached to the bottom of the convex portion 142a by welding.

A cap-down 146 is installed between the vent plate 142 and the sub-plate 147. The cap-down 146 has a disc shape and includes a hole in which the convex portion 142a can fit, which is formed at the center thereof. An insulating plate 145 is installed between the cap-down 146 and the vent plate 142 to insulate the cap-down 146 and the vent plate 142 from each other. A hole in which the convex portion 142a fits is also formed at the center of the insulating plate 145. Therefore, the convex portion 142a of the vent plate 142 can be easily bonded with the sub-plate 147 through the holes.

The sub-plate 147 is welded to each of the convex portion 142a and the cap-down 146. The cap-down 146 is electrically connected with the electrode assembly 110 through a lead member 132.

The current collected in the electrode assembly 110 is transmitted to the vent plate 142 by passing through the lead member 132, the cap-down 146, and the sub-plate 147 in sequence. The vent plate 142 transmits the current to an outer terminal 143b of the cap-up 143 by being bonded with the cap-up 143.

Figure 2:
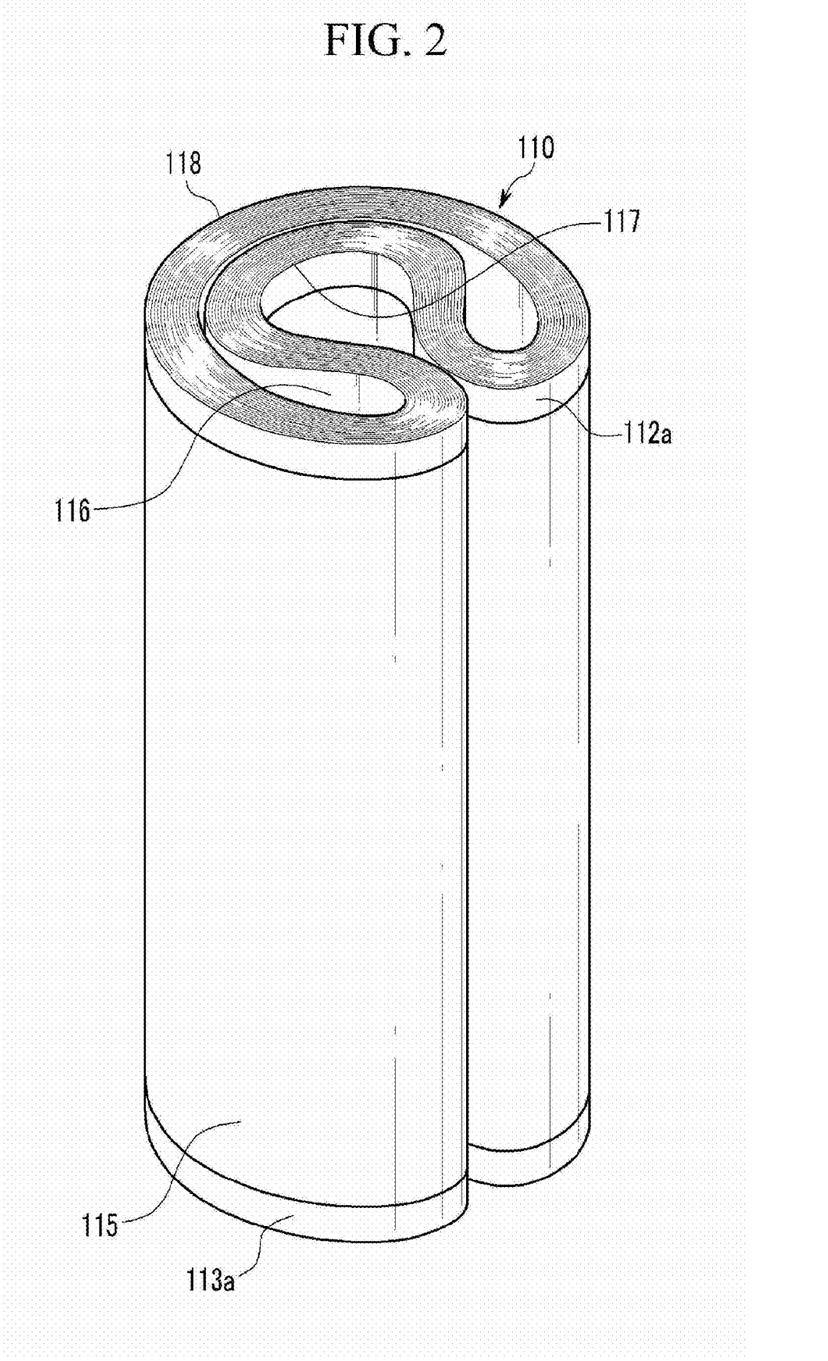
FIG. 2 is a perspective view of an electrode assembly according to a first exemplary embodiment of the present invention.
Figure 3:
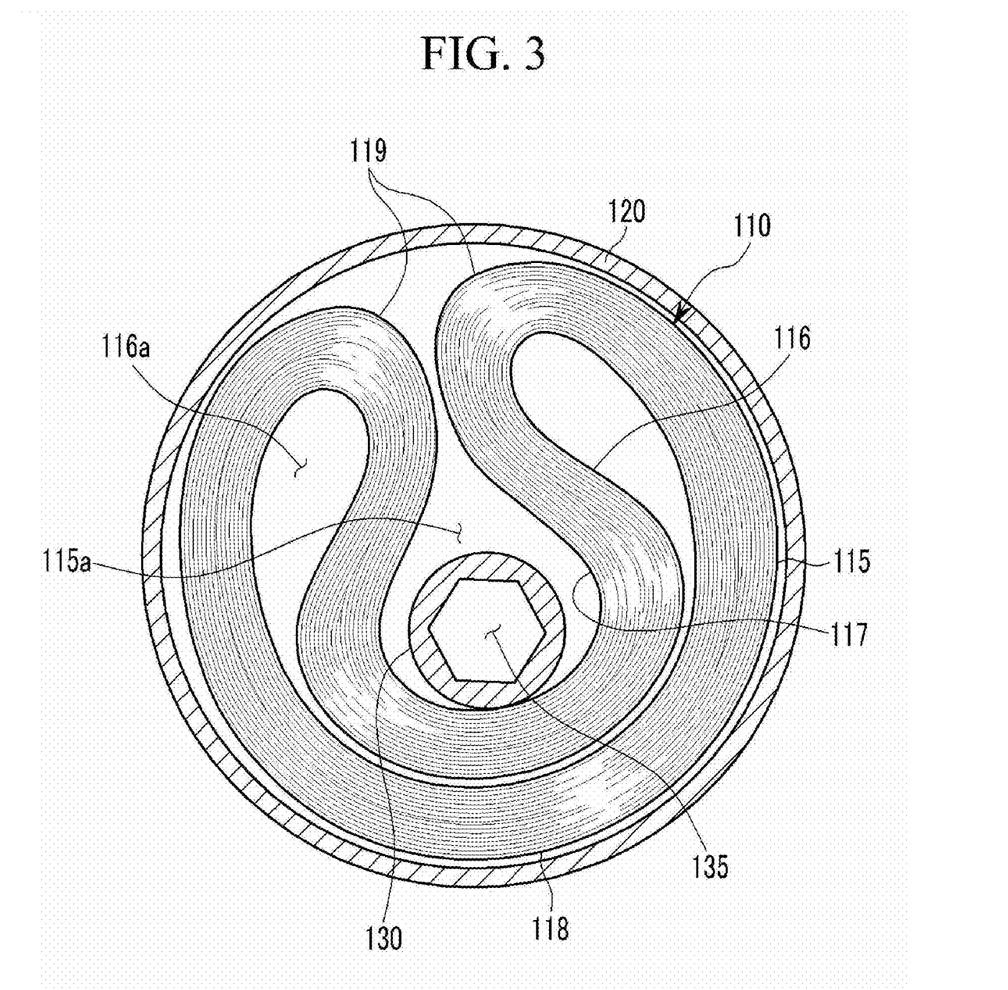
FIG. 3 is a transverse cross-sectional view of a rechargeable battery according to a first exemplary embodiment of the present invention.

FIG. 2 is a perspective view of an electrode assembly according to a first exemplary embodiment of the present invention. FIG. 3 is a transverse cross-sectional view of a rechargeable battery according to the first exemplary embodiment of the present invention.

Referring to FIGS. 2 and 3, the electrode assembly 110 is wound as described above and the wound electrode assembly 110 includes an outer surface 115 formed at an outermost portion and an inner surface 116 formed at an innermost portion.

The electrode assembly 110 is firstly wound by a winding reel, etc. The electrode assembly 110 is pressed flat after the winding reel is removed from the inside of the electrode assembly 110. The electrode assembly 110 has a larger outer circumference and a smaller thickness than the electrode assembly in related art. An outer circumferential length of the electrode assembly 110 according to the present exemplary embodiment is larger than an outer circumferential length of the case 120.

The electrode assembly 110 is bent substantially in a C shape and inserted into the case 120. Therefore, a concave portion 117 that is bent and concaved is formed by the outer surface 115 of the electrode assembly 110 and a convex portion 118 that is rolled and convexly protruded is formed by the outer surface 115 facing a direction opposite to the concave portion 117. Portions of the outer surface 115 facing each other are formed by the concave portion 117. A first expansion space 115a (FIG. 3) is formed between the outer surface portions facing each other.

A support rod 130 (FIG. 3) that supports the electrode assembly 110 is inserted into the first expansion space 115a. The support rod 130 supports and presses the electrode assembly 110 toward the case 120 so that the electrode assembly 110 maintains a bent shape. The support rod 130 has a cylindrical shape and has an interior hollow portion 135 that passes through the support rod 130 in a longitudinal direction.

Further, the inner surface 116 is also bent similarly to the outer surface. Portions of the inner surfaces 116 facing each other are in contact with each other at a convexly protruded portion. The inner surfaces 116 are spaced from each other at ends 119 of the electrode assembly 110 to form a second expansion space 116a.

Ends 119 of the electrode assembly 110 are defined as an edge of a circumference formed when the electrode assembly 110 is wound and pressed flat and a portion adjacent thereto. At the ends 119, the inner surface is folded approximately at 180 degrees. After the electrode assembly 110 is pressed flat, both ends 119 are inserted into the case 120 and facing each other. Therefore, a central portion positioned between the ends 119 is bent to form the concave portion 117 and the ends 119 are spaced from each other to form an inlet of the first expansion space 115a. In the present exemplary embodiment, the ends 119 are spaced from each other, but the present invention is not limited thereto and the ends 119 may be in contact with each other.

The first expansion space 115a is formed at the center of the electrode assembly 110 by the outer surface 115 and the second expansion space 116a is formed adjacent the ends 119 by the inner surface 116. Therefore, when the electrode assembly 110 is expanded, the expansion spaces 115a and 116a can house the expanded electrode assembly 110, thereby preventing or reducing a stress in the electrode assembly 110.

In the general cylindrical battery, the outer surface has substantially the same circular shape as the inner surface of the case, thus, the outer surface of the electrode assembly is always convexed and does not have a concave portion.

However, as described in the present exemplary embodiment, the circumference of the electrode assembly 110 is wound to be greater than the circumference of the case 120 and is then pressed flat. Thereafter, when the circumference of the electrode assembly 110 is inserted into the case 120 by bending the circumference of the electrode assembly 110, the expansion spaces 115a and 116a are formed between the electrode assembly 110 and the case 120 and between the electrode assemblies 110, such that it is possible to prevent or reduce stress from being concentrated on the electrode assembly 110 even if the electrode assembly expands. Accordingly, it is possible to prevent or reduce deterioration of the output of the rechargeable battery 100 and to extend the lifespan of the rechargeable battery by preventing or reducing deterioration.

Further, the thickness of the electrode assembly 110 is smaller than a thickness of the known electrode assembly, such that a distance between the inner surface 116 and the outer surface 115 decreases. As a result, heat generated from the inside of the electrode assembly 110 is easily transmitted to the outside, thereby improving heat radiation efficiency of the rechargeable battery 100.

Figure 4:
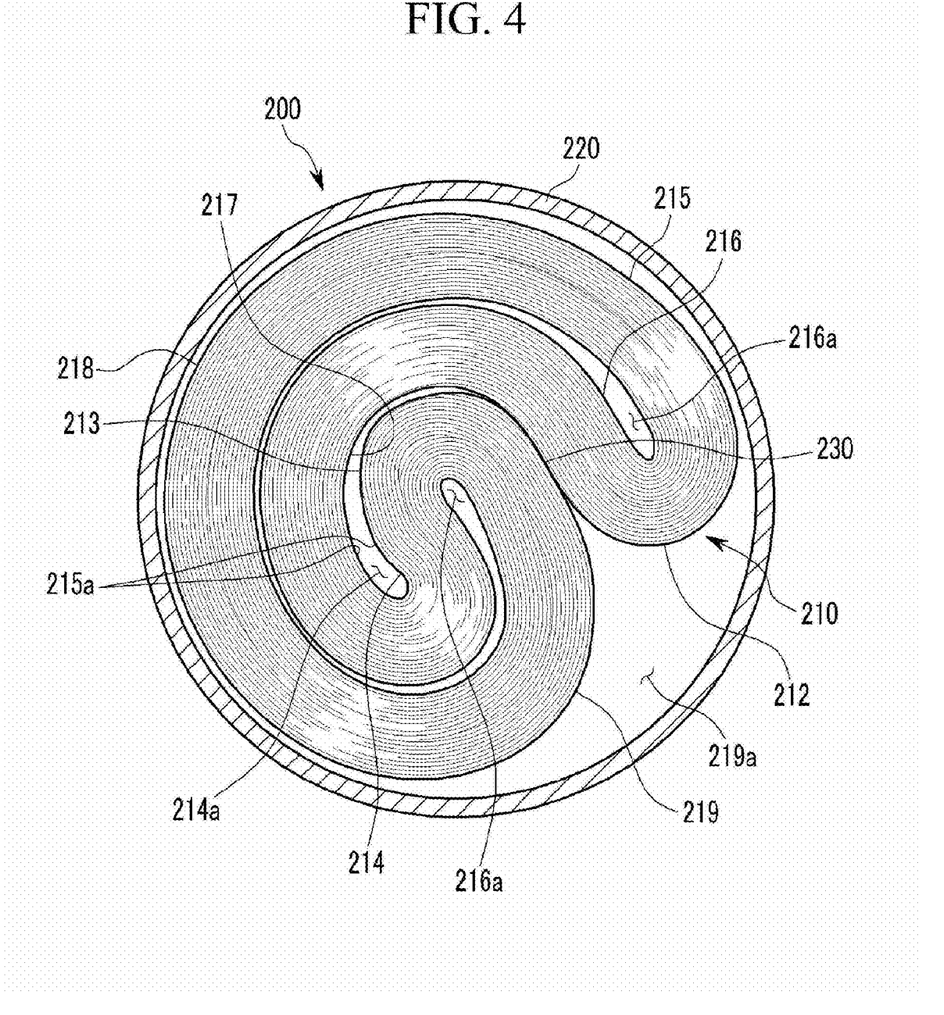
FIG. 4 is a cross-sectional view of a rechargeable battery according to a second exemplary embodiment of the present invention.

FIG. 4 is a cross-sectional view of a rechargeable battery according to a second exemplary embodiment of the present invention.

Referring to FIG. 4, the rechargeable battery 200 according to the exemplary embodiment has substantially the same structure as the rechargeable battery according to the first exemplary embodiment except for a shape of an electrode assembly 210. Therefore, the same components will not be repetitively described.

The electrode assembly 210 according to the present exemplary embodiment is bent. The electrode assembly 210 includes an outer surface 215 formed at an outermost portion thereof and an inner surface 216 formed at an innermost portion thereof.

Therefore, a concave portion 217 that is rolled and depressed is formed by the outer surface 215 of the electrode assembly 210 and a convex portion 218 that is rolled and convexly protruded is formed by the outer surface 215 that faces a direction opposite to the concave portion 217.

The electrode assembly 210 is wound and pressed flat in a plate shape. As a result, two ends 212 and 213 are formed on a circumferential surface of the electrode assembly 210. The concave portion 217 is formed between the first end 212 and the second end 213, and the second end 213 is adjacent the concave portion 217, as shown in FIG. 4, when the electrode assembly 210 is inserted into the case 220.

The outer surface 215 constituting the concave portion 217 and the outer surface 215 constituting the second end 213 face each other. A folded bent portion 214 is formed between the second end 213 and the concave portion 217 so that the second end 213 is inserted into the concave portion 217 to be adjacent the concave portion.

The outer surface 215 of the electrode assembly 210 is bent once at a portion where the concave portion 217 is formed and bent once more at the bent portion 214, such that the outer surface is rolled in a spiral. Therefore, the electrode assembly 210 has a first convex portion 218 on the outer surface 215 facing the direction opposite to the concave portion 217 and a second convex portion 219 on the outer surface facing the direction opposite to the bent portion 214.

The outer surface 215 that links the second convex portion 219 and the second end 213 is in contact with the outer surface that links the first end 212 and the concave portion 217 to constitute an interface portion 230. In the case of the electrode assembly 210, the outer surface of the electrode assembly 210 has opposed portions 215a that face each other.

A second expansion space 216a in which inner surfaces 216 are spaced from each other is formed adjacents ends 212, 213 of the electrode assembly 210. Additionally, the outer surfaces 215 are spaced from each other in the bent portion 214 such that a third expansion space 214a is formed between the outer surfaces 215. Further, the second convex portion 219 is spaced from an inner surface of the case 220, such that a fourth expansion space 219a is formed between the second convex portion 219 and the inner surface of the case 220.

As described in the present exemplary embodiment, when the outer surface 215 of the wound electrode assembly 210 is bent twice, occupancy rate of the electrode assembly 210 in the case 220 can be increased, thus, an output per volume can be improved. Further, it is possible to prevent a large stress from acting on the expanding electrode assembly 210 by forming the second expansion space 216a and the third expansion space 214a, thereby preventing the rechargeable battery 200 from being deteriorated or the lifespan of the rechargeable battery 200 from being shortened.

Further, by the forming the fourth expansion space 219a, when the electrode assembly 210 is expanded, the second end can move toward or into the fourth expansion space 219a, thereby preventing the stress from being increased due to pressing of the electrode assembly 210.

Even though the outer surfaces 215 of the electrode assembly 210 are in contact with each other on the interface surface 230, when the electrode assembly 210 is expanded, the electrode assembly 210 is further bent and moves to the third expansion space 214a. Therefore it is possible to prevent the stress from being increased.

Figure 5A:
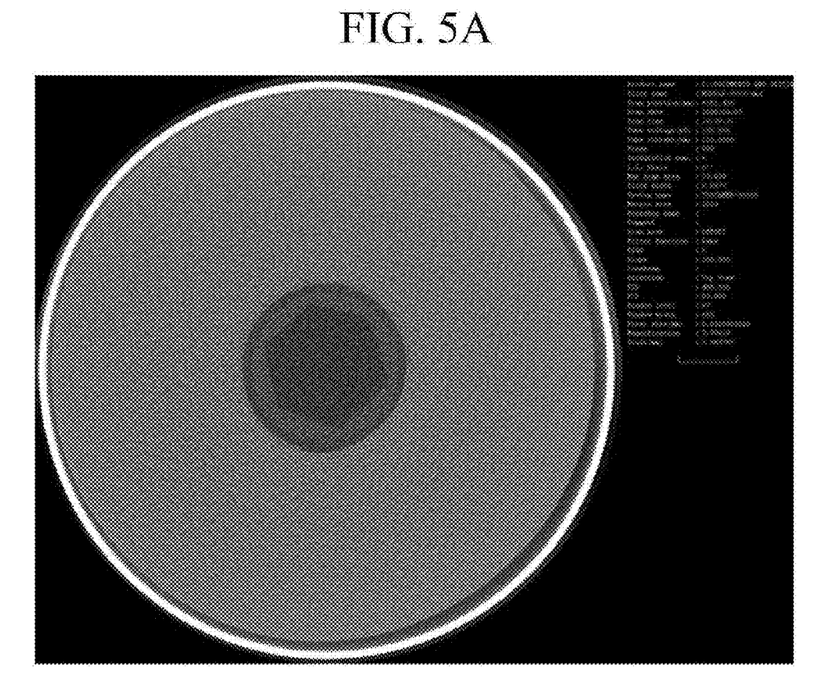
FIG. 5A is a photograph of a cylindrical battery photographed by computer tomography (CT) in related art.
Figure 5B:
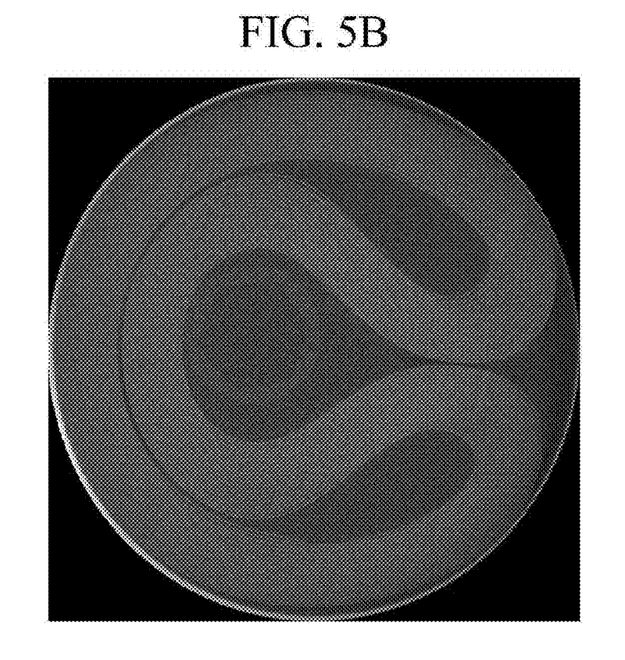
FIG. 5B is a photograph of a rechargeable battery photographed by computer tomography (CT) according to the first exemplary embodiment of the present invention.
Figure 5C:
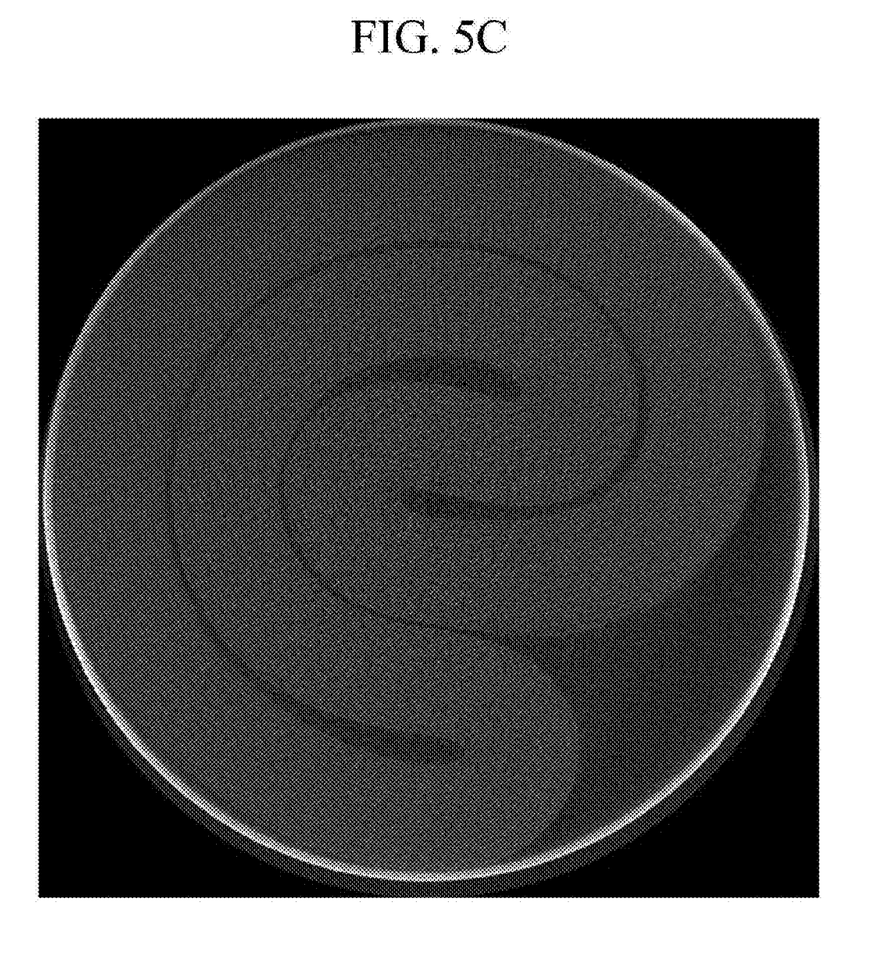
FIG. 5C is a photograph of a rechargeable battery photographed by computer tomography (CT) according to the second exemplary embodiment of the present invention.

FIG. 5A is a photograph of a cylindrical battery photographed by computer tomography (CT) in related art, FIG. 5B is a photograph of a rechargeable battery photographed by computer tomography (CT) according to the first exemplary embodiment of the present invention, and FIG. 5C is a photograph of a rechargeable battery photographed by computer tomography (CT) according to the second exemplary embodiment of the present invention.

As shown in FIG. 5A, in the case of a structure of the known cylindrical battery, the occupancy rate of the electrode assembly in the case is high, but space is scarce within and around the electrode assembly, such that when the electrode assembly is expanded, a large stress acts on the electrode assembly.

However, as shown in FIGS. 5B and 5C, according to the first and second exemplary embodiments of the present invention, larger expansion spaces are formed between the electrode assemblies to house the expanding electrode assembly, such that it is possible to minimize the stress acting on the expanding electrode assembly.

Figure 6:
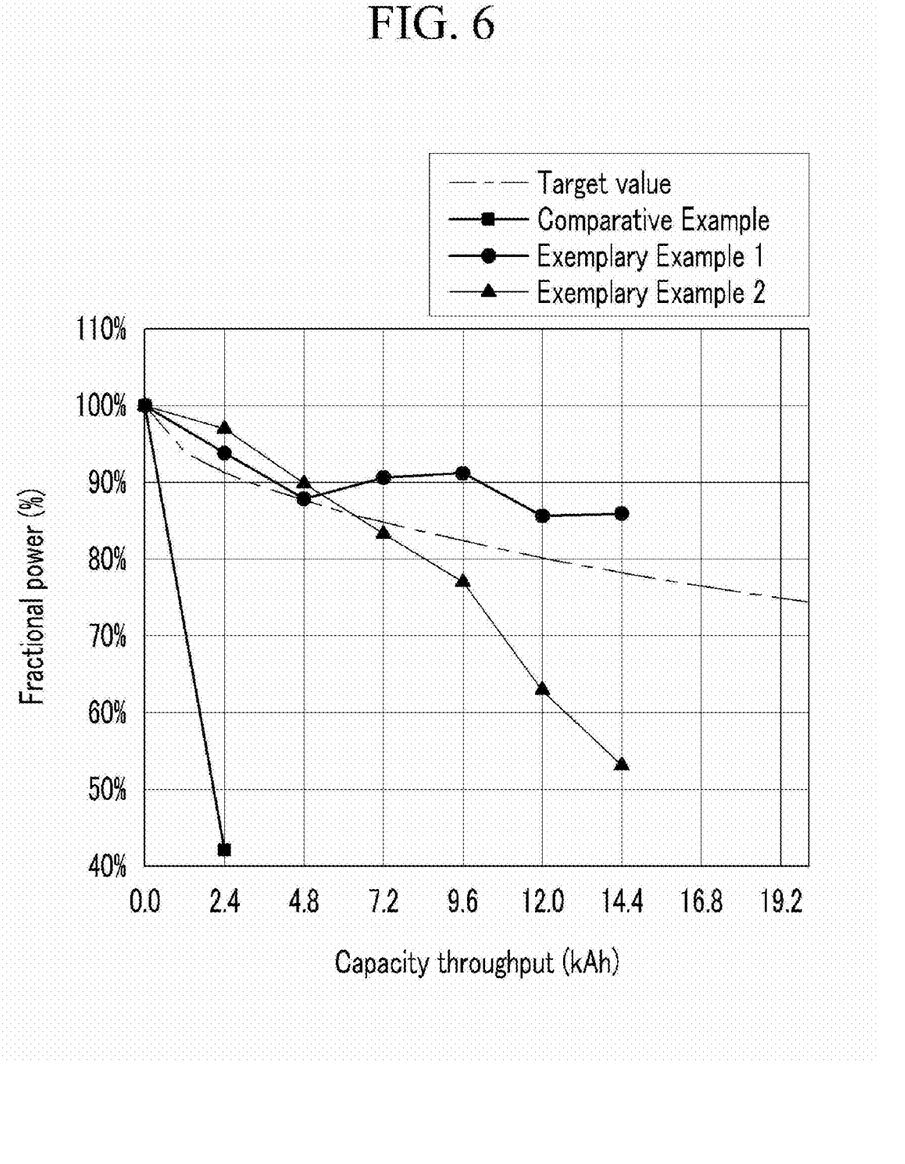
FIG. 6 is a graph illustrating a fractional power depending on a capacity throughput of a cylindrical battery according to first and second exemplary embodiments and in related art.

FIG. 6 is a graph illustrating a factional power depending on a capacity throughput of a cylindrical battery according to first and second exemplary embodiments and in related art.

The capacity throughput means a cumulative charge capacity and a discharge capacity. FIG. 6 illustrates a deterioration degree of the output due to deterioration of the electrode assembly as charge and discharge are repeated.

As shown in FIG. 6, the output of the known cylindrical battery of FIG. 5A, which is a comparative example, falls up to approximately 40% at a capacity throughput of 2.4 kAh. This means that the electrode assembly is expanded such that an electrolyte solution in the electrode assembly is squeezed out and the electrode assembly is deteriorated, thus, rapidly degraded. The output is excessively lowered, thus, a comparison is meaningless and the battery output performance is lowered below a required condition, such that an experiment for the comparative example is stopped at 2.4 kAh.

Contrary to this, the output of the rechargeable battery according to the first exemplary embodiment of the present invention is lowered by approximately 15% at a capacity throughput of 14.4 kAh. Therefore, the rechargeable battery operates in a normal state.

Further, the rechargeable battery according to the second exemplary embodiment of the present invention maintains an output of 80% or more at a capacity throughput of 7.2 kAh, but the output of the rechargeable battery is lowered to approximately 50% at a capacity throughput of 14.4 kAh. However, the rechargeable battery according to the second exemplary embodiment also remarkably improves an output lowering speed in comparison with the known rechargeable battery.

In the experiment, the rechargeable battery according to the first exemplary embodiment shows the best performance and shows a performance better than a target value.

Figure 7:
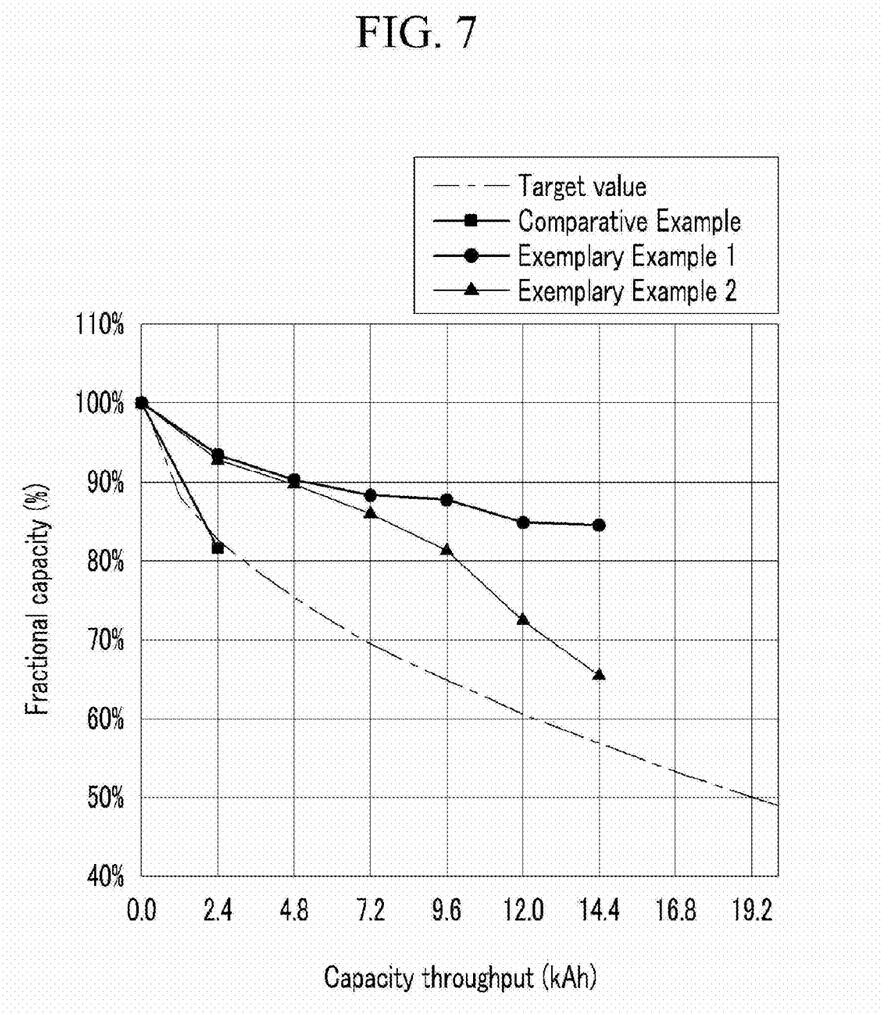
FIG. 7 is a graph illustrating a fractional capacity depending on a capacity throughput of a cylindrical battery according to first and second exemplary embodiments and in related art.

FIG. 7 is a graph illustrating a fractional capacity depending on a capacity throughput of a cylindrical battery according to first and second exemplary embodiments and in related art. FIG. 7 illustrates a lowering degree of a capacity due to deterioration of the electrode assembly as charge and discharge are repeated.

The capacity is measured in the experiment of FIG. 6. The capacity of the known cylindrical battery which is a known comparative example is rapidly lowered to 90% at a capacity throughput of 2.4 kAh. The reason why the comparative example is measured even at 2.4 kAh is that a capacity deterioration level of the battery is lowered below a required condition.

Contrary to this, the rechargeable battery according to the first exemplary embodiment maintains a capacity of 90% or more at a capacity throughput of 14.4 kAh and the rechargeable battery according to the second exemplary embodiment of the present invention maintains a capacity of 80% or more at the capacity throughput 14.4 kAh.

As shown in FIGS. 5 and 6, the rechargeable batteries according to the first and second exemplary embodiments of the present invention can prevent the capacity and the output from being deteriorated by preventing the deterioration in comparison with the known rechargeable battery.

Figure 8:
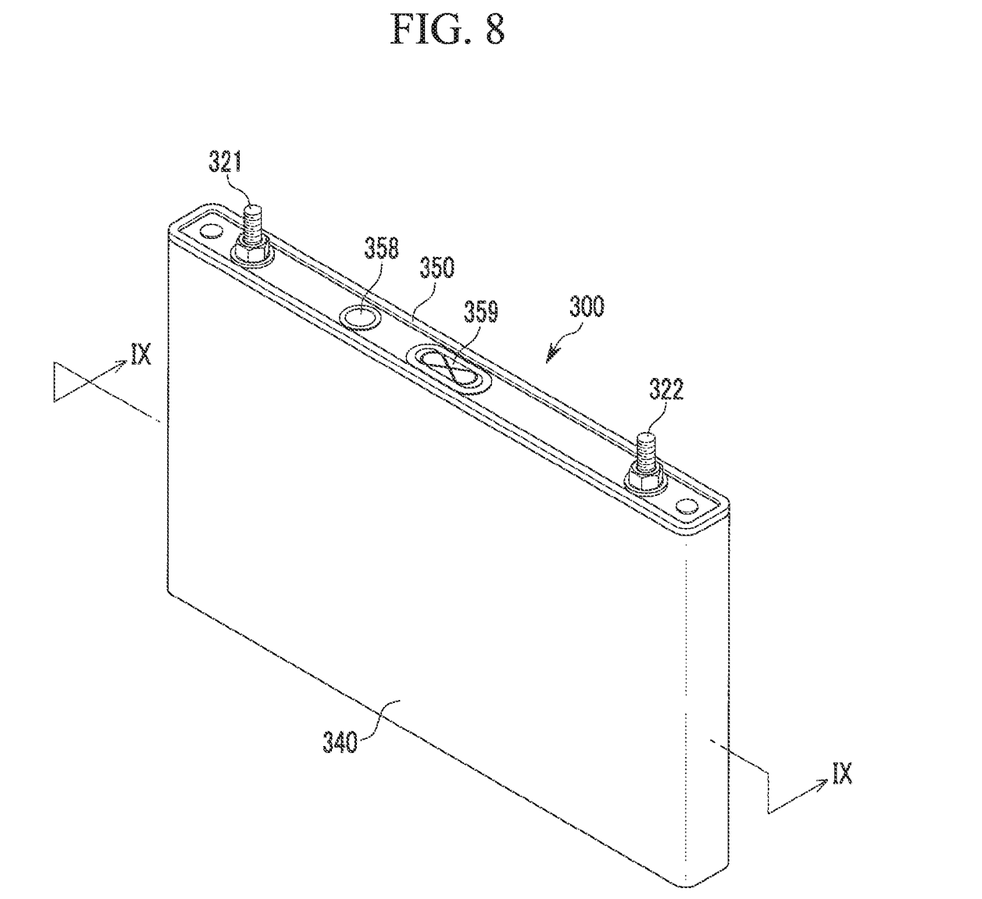
FIG. 8 is a perspective view of a rechargeable battery according to a third exemplary embodiment of the present invention.
Figure 9:
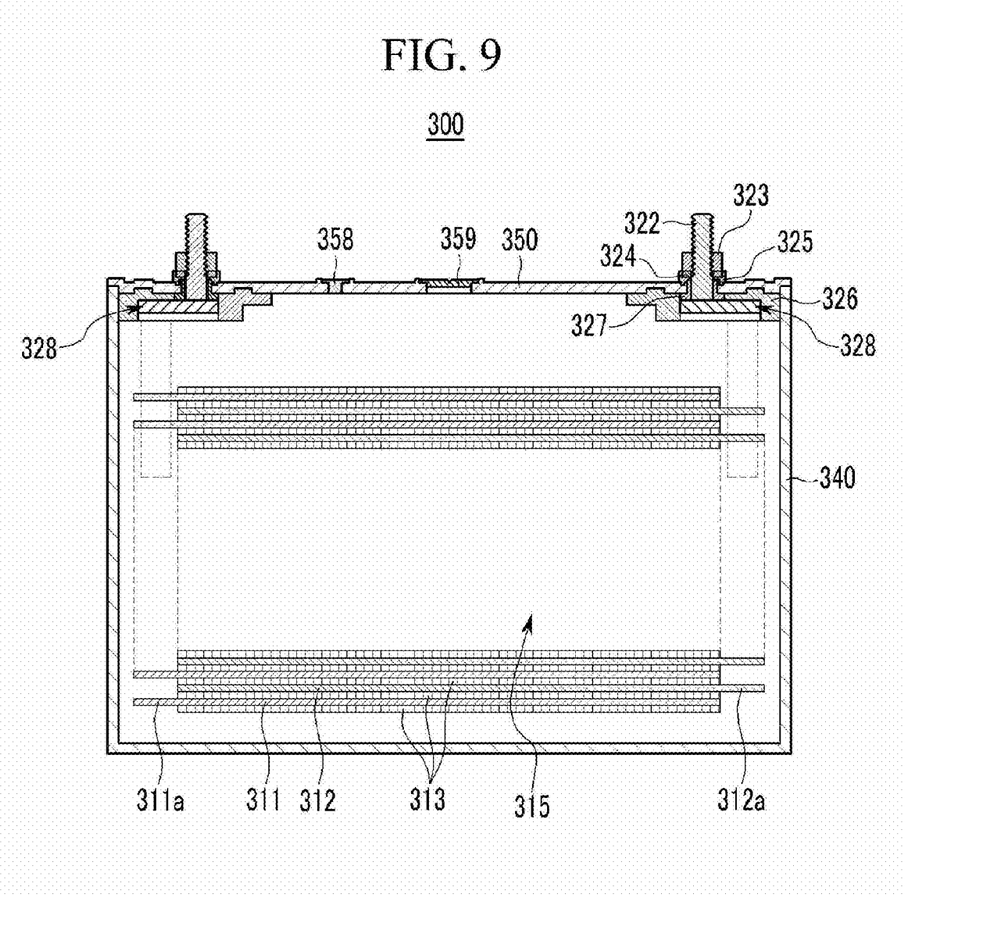
FIG. 9 is a cross-sectional view taken along line IX-IX of FIG. 8.

FIG. 8 is a perspective view of a rechargeable battery according to a third exemplary embodiment of the present invention. FIG. 9 is a cross-sectional view taken along line IX-IX of FIG. 8.

Referring to FIGS. 8 and 9, the rechargeable battery 300 according to the third exemplary embodiment includes an electrode assembly 310 (FIG. 10) wound with a separator 313, which is an insulator, interposed between a positive electrode 311 and a negative electrode 312, a case 340 in which the electrode assembly 310 is incorporated, a positive terminal 321 and a negative terminal 322 that are electrically connected with the electrode assembly 310, and a cap plate 350 that is joined to an opening of the case 340.

The positive electrode 311 and the negative electrode 312 include a coated portion where a current collector formed of a thin metal foil is coated with an active material and uncoated portions 311a and 312a where the current collector is absent (i.e., not coated with) the active material. The uncoated portions 311a and 312a are formed at side ends of the positive electrode 311 and the negative electrode 312 in longitudinal directions of the positive electrode 311 and the negative electrode 312. In addition, the positive electrode 311 and the negative electrode 312 are wound with the separator 313, which is the insulator, interposed therebetween.

The positive terminal 321 is electrically connected to the positive electrode uncoated portion 311a of the electrode assembly 310 via a lead member 328 and the negative terminal 322 is electrically connected to the negative electrode uncoated portion 312a via the lead member 328. An insulation member 326 for insulating the lead member 328 and the cap plate 350 from each other is installed between the lead member 328 and the cap plate 350.

The cap plate 350 is formed of a thin plate. An electrolyte solution inlet into which an electrolyte solution is injected is formed in the cap plate 350 and a sealing cap 358 is installed in the electrolyte solution inlet. Further, a vent portion 359 having a groove that may be fractured depending on an internal set pressure is installed in the cap plate 350.

An upper gasket 325 and a lower gasket 327 are interposed between the cap plate 350 and the terminals 321 and 322 to insulate the cap plate 350 and the terminals 321 and 322 from each other.

The lower gasket 327 fits in a terminal hole and the upper gasket 325 is installed on the cap plate 350. A washer 324 for absorbing a fastening force is installed on the upper gasket 325. Nuts 323 for supporting the terminals 321 and 322 from the upside are installed in the positive terminal 321 and the negative terminal 322.

Figure 10:
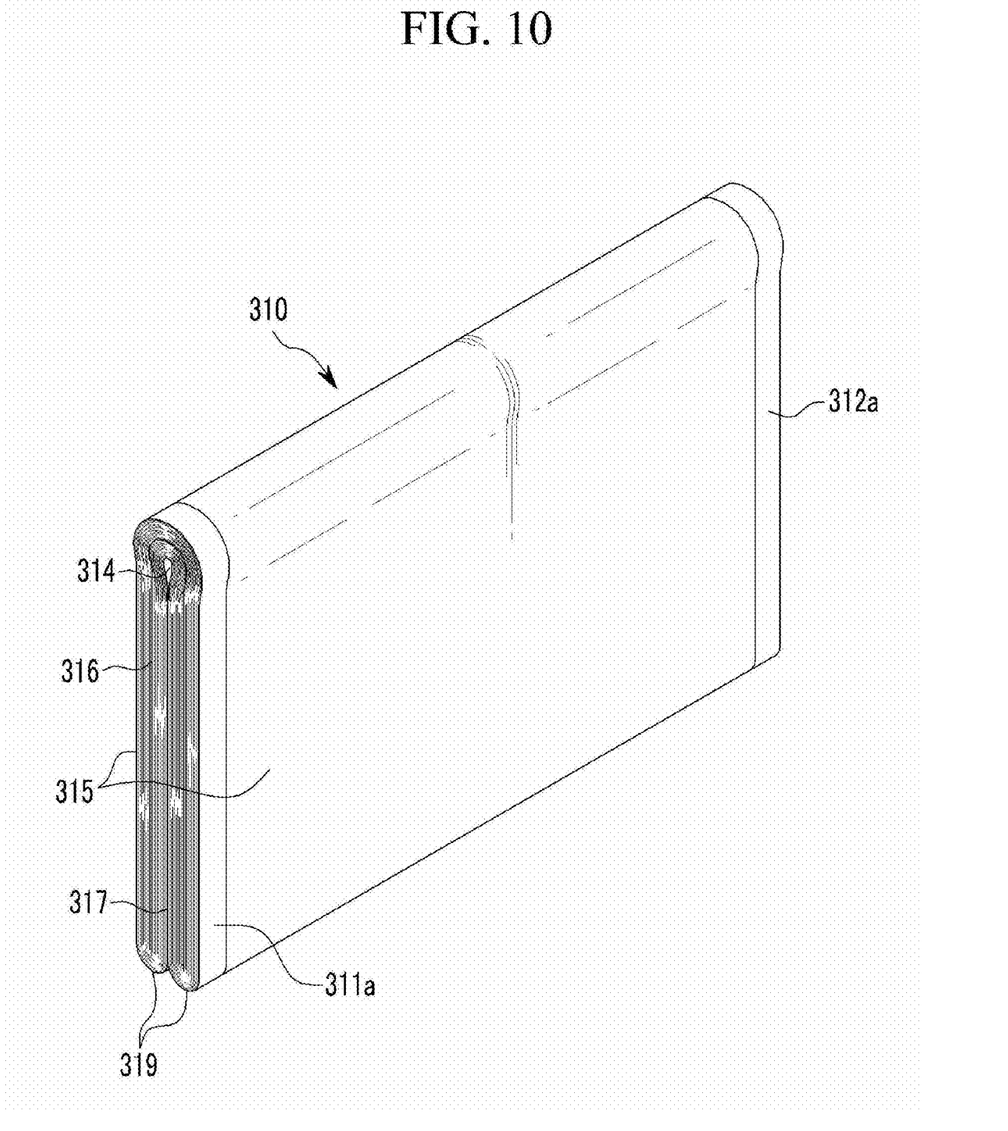
FIG. 10 is a perspective view of an electrode assembly according to a third exemplary embodiment of the present invention.

FIG. 10 is a perspective view of an electrode assembly according to a third exemplary embodiment of the present invention.

Referring to FIG. 10, the electrode assembly according to the present exemplary embodiment is wound and pressed flat. The pressed electrode assembly 310 is folded in half at the center of a circumference thereof. A direction of a folded axis is substantially parallel to a direction of a line extending between corresponding portions of the uncoated portions 311a and 312a.

When the electrode assembly 310 is wound, the electrode assembly 310 includes an outer surface 315 positioned at an outermost portion and an inner surface 316 positioned at an innermost portion. Further, when the electrode assembly 310 is folded and pressed flat, the electrode assembly 310 has a substantially plate shape and the electrode assembly 310 has two ends 319 in a circumferential direction. The electrode assembly 310 is folded so that the both ends 319 are stacked adjacent to each other. A concave portion 314 is formed between the outer surfaces 315 of the electrode assembly 310 at the folded portion. Further, an interface portion 317 that is in contact with the outer surface 315 of the electrode assembly 310 is formed between the ends 319.

As such, when the electrode assembly 310 is folded, a tension force is generated on the inner surface 316 by the bent portion and the inner surface 316 is pulled to be substantially parallel to the outer surface 315 of the electrode assembly 310.

In the known rechargeable battery, the inner surface is not folded and formed in a straight line unlike the present exemplary embodiment. Since there is no pressure difference between the inside and the outside and no structure to support the inner surface, the inner surface may wrinkle. When the inner surface wrinkles, gaps between the positive electrode and the negative electrode and the separator are non-uniform, such that ions in the battery move non-uniformly.

In particular, in a known quadrangular battery, a core for supporting the electrode assembly is not installed at the center of the electrode assembly. When the core is not installed, it is possible to prevent the stress from being concentrated on the electrode assembly, but an interface is still non-uniform as described above.

However, as described in the present exemplary embodiment, when the electrode assembly 310 is folded and bent, the inner surface 316 of the electrode assembly 310 is transformed, thus, the inner surface 316 is prevented from being wrinkled, thereby improving stability of the rechargeable battery. Further, as described in the present exemplary embodiment, when the electrode assembly 310 is wound to be relatively large, the electrode assembly 310 is relatively thin and a distance between the inner surface 316 and the outer surface 315 decreases, such that it is possible to reduce a temperature deviation between the inner surface 316 and the outer surface 315. Heat generated from the inside of the rechargeable battery during charging and discharging the rechargeable battery can be easily discharged to the outside to prevent an abnormal reaction from occurring at a high temperature. Accordingly, the rechargeable battery 300 according to the present exemplary embodiment easily discharges the internal heat to the outside, thereby improving the performance and lifespan thereof.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
    an electrode assembly comprising a positive electrode, a negative electrode, and a separator between the positive electrode and the negative electrode wound together; and
    a case housing the electrode assembly,
    wherein the electrode assembly has an inner surface and an outer surface and first and second end portions, the outer surface having a concave portion between the first and second end portions, wherein the concave portion subtends an angle of at least 180 degrees such that the outer surface at the first end portion faces the outer surface at the second end portion, and wherein a first expansion space is defined between the concave portion and an inner surface of the case.

2. The rechargeable battery of claim 1, wherein the outer surface has a convex portion facing a first direction, and wherein the concave portion faces a second direction substantially opposite to the first direction.

3. The rechargeable battery of claim 1, wherein the electrode assembly is folded.

4. The rechargeable battery of claim 1, wherein the positive electrode includes a first coated portion coated with an active material and a first uncoated portion absent the active material and extending from the first coated portion in a third direction; and
    wherein the negative electrode includes a second coated portion coated with an active material and a second uncoated portion absent the active material and extending from the second coated portion in a fourth direction substantially opposite to the third direction.

5. The rechargeable battery of claim 1, further comprising a support rod contacting the concave portion.

6. The rechargeable battery of claim 1, wherein the case has a cylindrical shape, and wherein the inner surface of the electrode assembly is folded.

7. The rechargeable battery of claim 1, wherein the electrode assembly has a C shape.

8. The rechargeable battery of claim 1, wherein the outer surface has a spiral shape.

9. The rechargeable battery of claim 1, wherein a second expansion space is defined by the inner surface of the electrode assembly.

10. The rechargeable battery of claim 1, wherein the inner surface of the electrode assembly is in tension.

11. The rechargeable battery of claim 1, wherein the outer surface at the first end portion is substantially parallel to the outer surface at the second end portion.

12. A rechargeable battery, comprising:
an electrode assembly comprising a positive electrode, a negative electrode, and a separator between the positive electrode and the negative electrode wound together; and
a case housing the electrode assembly,
wherein the electrode assembly has an inner surface and an outer surface, the outer surface having a concave portion, and wherein a first expansion space is defined between the concave portion and an inner surface of the case, and
wherein the electrode assembly has a first end extending into a space defined by the concave portion.

13. A rechargeable battery, comprising:
an electrode assembly comprising a positive electrode, a negative electrode, and a separator between the positive electrode and the negative electrode wound together; and
a case housing the electrode assembly,
wherein the electrode assembly has an inner surface and an outer surface, the outer surface having a concave portion, and wherein a first expansion space is defined between the concave portion and an inner surface of the case, and
wherein the outer surface has a first portion and a second portion contacting each other at an interface.

14. A rechargeable battery, comprising:
an electrode assembly comprising a positive electrode, a negative electrode, and a separator between the positive electrode and the negative electrode wound together; and
a case housing the electrode assembly,
wherein the electrode assembly has an inner surface and an outer surface, the outer surface having a concave portion, and wherein a first expansion space is defined between the concave portion and an inner surface of the case, and
wherein the electrode assembly has an outer circumferential length greater than an outer circumferential length of the case.

15. A rechargeable battery, comprising:
an electrode assembly comprising a positive electrode, a negative electrode, and a separator between the positive electrode and the negative electrode wound together; and
a case housing the electrode assembly,
wherein the electrode assembly has an inner surface and an outer surface, the outer surface having a concave portion, and wherein a first expansion space is defined between the concave portion and an inner surface of the case, and
wherein the outer surface is folded such that a first section of the outer surface contacts a second section of the outer surface.

16. The rechargeable battery of claim 15, wherein the case has a quadrangular shape.

* * * * *